US007683503B2

(12) United States Patent
Yamaguchi

(10) Patent No.: US 7,683,503 B2
(45) Date of Patent: Mar. 23, 2010

(54) DEAD BATTERY PREVENTING DEVICE FOR PREVENTING ENGINE START FAILURE OF VEHICLE HAVING ECONOMY RUNNING FUNCTION AND DEAD BATTERY PREVENTION METHOD

(75) Inventor: Kazuhi Yamaguchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 356 days.

(21) Appl. No.: 11/711,008

(22) Filed: Feb. 27, 2007

(65) Prior Publication Data

US 2007/0200431 A1 Aug. 30, 2007

(30) Foreign Application Priority Data

Feb. 28, 2006 (JP) ............................ 2006-051425

(51) Int. Cl.
*H02H 7/18* (2006.01)

(52) U.S. Cl. .................................................... 307/10.7

(58) Field of Classification Search ................ 307/10.7; 290/40 R, 40 C; 477/4, 101, 102; 702/63; 123/632

See application file for complete search history.

(56) References Cited

U.S. PATENT DOCUMENTS 5,048,503 A * 9/1991 Suzuki et al. ............... 123/632
6,358,180 B1 * 3/2002 Kuroda et al. .................. 477/4

FOREIGN PATENT DOCUMENTS

JP 58-202368 11/1983
JP 2003-138955 5/2003
JP 2004-143934 5/2004
JP 2004-251220 9/2004

* cited by examiner

*Primary Examiner*—Fritz M Fleming
*Assistant Examiner*—Daniel Cavallari
(74) *Attorney, Agent, or Firm*—Wenderoth, Lind & Ponack, L.L.P.

(57) ABSTRACT

A dead battery preventing device enables to prevent an engine start failure (a dead battery) of a vehicle having an economy running function which is caused by the vehicle's being left in an engine stall state. The dead battery preventing device to be mounted on a vehicle having an economy running function comprises a unit for judging whether an informing condition for informing a user that the vehicle is in an engine stall state has been satisfied or not, and a unit for informing the user that the vehicle is in the engine stall state when it is judged that the informing condition has been satisfied, wherein the informing condition includes that the vehicle is in the engine stall state and that the vehicle shifted from an economy running state to the engine stall state.

5 Claims, 9 Drawing Sheets

UBm
UB2
UB1
IG
ACC
UAn
UA2
UA1
13
M
15
14
ST
IG
ACC
OFF
B
12
11
Load
16
V
17
A
9
2 Speed Sensor
3 Pressing Sensor
4 Hood Sensor
5 Collision Sensor
L2
L1
Alternator
10
6(6A,6B)
18 Temperature Sensor
Economy Running Control Device
1
Sensor Acquisition Unit
8
7(7A,7B)
Microcomputer
Infomation Device
19
IG Signal
Door Opening/Closing Signal
Engine Speed Signal

DEAD BATTERY PREVENTING DEVICE FOR PREVENTING ENGINE START FAILURE OF VEHICLE HAVING ECONOMY RUNNING FUNCTION AND DEAD BATTERY PREVENTION METHOD

BACKGROUND OF THE INVENTION

1. Field of the Invention

The present invention relates to a dead battery preventing device and a dead battery prevention method and, more particularly, to a dead battery preventing device for preventing an engine start failure (a so-called dead battery) of a vehicle having an economy running function and a dead battery prevention method.

2. Description of the Relevant Art

Hitherto, in order to meet the requirement of conservation of natural resources, various kinds of techniques whereby fuel efficiency of a vehicle is improved have been proposed, and have been commercially practical. For example, there is a function (so-called economy running function) whereby an engine is automatically stopped when a vehicle stopped at an intersection or the like, and then, the engine is automatically started when a driver's foot was taken off a brake pedal, resulting in a reduction in fuel consumption during a stop.

When the speed is 0 km/h and the brake pedal is held down, it is judged that an engine automatic stop condition became satisfied and the engine is automatically stopped, leading to the economy running state (idle stop state). When the brake was released in the economy running state and therefore, an engine automatic start condition became satisfied, the engine is automatically started.

The vehicles having the above-described economy running function have problems specific thereto, and various kinds of techniques for solving the problems have been proposed. For example, the below-mentioned Patent Document 1 discloses a technique, wherein when a hood (bonnet) covering an engine is open in an economy running state, an event where the engine starts in the middle of an engine inspection or the like and a hand of a worker or the like gets caught in a rotating part of the engine can be avoided by prohibiting a starter of the engine from being activated (i.e. prohibiting a start of the engine).

The below-mentioned Patent Documents 2 and 3 disclose techniques, wherein when a big impact was given to a vehicle (e.g. a bump or opening/closing of a door occurred) in an economy running state, an event where an engine starts owing to a release of a brake without a driver's intention caused by the big impact, leading to a sudden start of the vehicle can be avoided by prohibiting a start of the engine.

Some of actually produced vehicles having the economy running function are manufactured in such a manner that an engine does not start even if the vehicle is shifted from an economy running state to an engine stall state and a brake is released when a hood was opened or a collision occurred in the economy running state, in order to secure safety.

Even if the vehicle is shifted from the economy running state to the engine stall state, a power supply to electrical components (such as an air conditioner) mounted on the vehicle is continued, similarly to the case of the economy running state. In either case of the economy running state and the engine stall state, the power supply to the electrical components mounted on the vehicle is conducted only with electric power from a battery since an alternator whose drive source is the engine does not generate power.

By the way, in the engine stall state, as described above, the engine does not start even if the driver's foot was taken off the brake pedal, and in order to restart the engine, the driver need turn an ignition key to a start position or push an engine switch. As a result, after the vehicle is shifted from the economy running state to the engine stall state, the driver might leave the vehicle in the engine stall state. For example, the driver might leave the vehicle without knowing that the vehicle is in the engine stall state.

In this case, if the engine stall state is long continued, there is a risk that electrical discharge of the battery may excessively progress, resulting in a dead battery (an engine start failure).

[Patent Document 1] Japanese Patent Application Laid-Open Publication No. 2004-251220

[Patent Document 2] Japanese Patent Application Laid-Open Publication No. 2003-138955

[Patent Document 3] Japanese Patent Application Laid-Open Publication No. 2004-143934

SUMMARY OF THE INVENTION

The present invention was accomplished in order to solve the above problem, and it is an object of the present invention to provide a dead battery preventing device for preventing an engine start failure (a dead battery) of a vehicle having an economy running function which is caused by the vehicle's being left in an engine stall state, and a dead battery prevention method.

In order to achieve the above object, a dead battery preventing device according to a first aspect of the present invention is characterized by being a dead battery preventing device to be mounted on a vehicle having an economy running function, comprising an informing condition satisfaction judging unit for judging whether an informing condition for informing a user that the vehicle is in an engine stall state has been satisfied or not, and an information unit for informing the user that the vehicle is in the engine stall state when it is judged that the informing condition has been satisfied by the informing condition satisfaction judging unit, wherein the informing condition includes that the vehicle is in the engine stall state and that the vehicle shifted from an economy running state to the engine stall state.

When the dead battery preventing device according to the first aspect of the present invention is used, the user is informed that the vehicle is in the engine stall state when it is judged that the informing condition for informing that the vehicle is in the engine stall state has been satisfied. In addition, the informing condition includes that the vehicle is in the engine stall state and that the vehicle shifted from the economy running state to the engine stall state.

Accordingly, for example, as soon as the vehicle shifted from the economy running state to the engine stall state, a beeping sound is produced. As a result, it is possible to allow the user to easily notice that the vehicle shifted from the economy running state to the engine stall state and that the vehicle is in the engine stall state.

Moreover, if the informing condition includes an elapse of a predetermined time after a shift to the engine stall state, a beeping sound is produced when the predetermined time elapses after the vehicle shifted from the economy running state to the engine stall state. As a result, it is possible to allow the user to easily notice that the vehicle has been shifted to the engine stall state from the economy running state.

Thus, since it is possible to allow the user to easily notice that the vehicle shifted from the economy running state to the engine stall state, it is possible to prevent the vehicle from being left in the engine stall state. As a result, it is possible to avoid an event where the vehicle is long left in the engine stall state and therefore, electrical discharge of a battery excessively progresses, resulting in a dead battery. Here, as the information method, a method for appealing to the auditory sense wherein a beeping sound or the like is produced, a method for appealing to vision wherein a display of a navigation system or the like, or meters installed on an instrument panel are used, and a method wherein a notice is provided to a portable device the user carries are exemplified.

Here, as the portable device, a key to be used in a keyless entry system for remotely controlling the opening/closing of doors, a smart key (a key the user carries in a pocket or else) to be used in a smart entry & start system whereby no key operation is required in opening/closing doors or starting an engine, and a cellular phone are exemplified.

A dead battery preventing device according to a second aspect of the present invention is characterized by comprising an operation presence judging unit for judging whether an operation for restricting a power supply to electrical components mounted on the vehicle by the user was conducted or not, wherein the informing condition includes that it is judged that the operation has not been conducted by the operation presence judging unit in the dead battery preventing device according to the first aspect of the present invention.

As described above, from a viewpoint of prevention of a dead battery, it is very important to inform the user that the vehicle is in the engine stall state so as to allow the user to notice that the vehicle is in the engine stall state. However, information more than necessary might actually have the opposite effect of leading to user discomfort.

When the dead battery preventing device according to the second aspect of the present invention is used, the informing condition includes that the operation for restricting a power supply to the electrical components by the user (e.g. an operation for switching the power to an OFF state or an ACC state) has not been conducted. In other words, even if the vehicle shifted from the economy running state to the engine stall state, the information is not provided when the operation for restricting a power supply to the electrical components was conducted.

When the operation was conducted, the progress speed of battery discharge becomes lower. Therefore, even if the engine stall state is continued for a little long time, there is a low risk that the battery may go dead. In addition, that the operation was conducted means a high possibility that the user knows a shift to the engine stall state. As a result, when the operation was conducted, it can be said that there is no particular problem even if the information is not provided. Thus, it is possible to prevent the information from being provided more than necessary, so as not to cause user discomfort.

A dead battery preventing device according to a third aspect of the present invention is characterized by comprising a movement judging unit for judging whether or not the user is leaving or left the vehicle, wherein the informing condition includes that it is judged that the user is leaving or left the vehicle by the movement judging unit in the dead battery preventing device according to the first or second aspect of the present invention.

When the dead battery preventing device according to the third aspect of the present invention is used, the informing condition includes that the user is leaving or left the vehicle. In other words, even if the vehicle shifted from the economy running state to the engine stall state, the information is not provided when the user is not leaving or is not away from the vehicle.

When the user does not leave the vehicle, there is a high possibility that the engine may be restarted before long. On the other hand, when the user left the vehicle, there is a risk that it may be long before the next start of the engine, resulting in long continuation of the engine stall state. Therefore, when the user does not leave the vehicle, it appears that there is no particular problem even if the information is not provided. Thus, it is possible to prevent the information from being provided more than necessary, so as not to cause user discomfort. Here, as the information method in this case, since the user leaves the vehicle, sounding an alarming device, lighting lamps, flashing hazard lights, sending a notice to a portable device and the like are preferable. Moreover, the frequency of information had better be high.

A dead battery preventing device according to a fourth aspect of the present invention is characterized by being a dead battery preventing device to be mounted on a vehicle having an economy running function, comprising a restricting condition satisfaction judging unit for judging whether a restricting condition for restricting a power supply to electrical components mounted on the vehicle has been satisfied or not, and a restriction unit for restricting the power supply to the electrical components when it is judged that the restricting condition has been satisfied by the restricting condition satisfaction judging unit, wherein the restricting condition includes that the vehicle is in an engine stall state, that the vehicle shifted from an economy running state to the engine stall state, and that an operation for restricting the power supply to the electrical components by a user has not been conducted, and includes any one of that a predetermined time elapsed from a point in time after the vehicle shifted to the engine stall state, that a battery charging rate reached a prescribed value or less, and that the user is leaving or left the vehicle.

When the dead battery preventing device according to the fourth aspect of the present invention is used, the power supply to the electrical components mounted on the vehicle is restricted when it is judged that the restricting condition for restricting the power supply to the electrical components has been satisfied. In addition, the restricting condition includes that the vehicle is in the engine stall state, and that the vehicle shifted from the economy running state to the engine stall state. Therefore, when the vehicle shifted from the economy running state to the engine stall state, for example, a power supply line to the electrical components is shut off, a power supply to the electrical components is stopped, and the progress speed of battery discharge becomes lower. As a result, even if the engine stall state is continued a little longer, it is possible to prevent a dead battery.

By the way, from a viewpoint of prevention of a dead battery, it is very important to restrict a power supply to the electrical components so as to lower the progress speed of battery discharge in the engine stall state. However, restrictions more than necessary might actually have the opposite effect of leading to user discomfort. That is because it is considered that a room temperature becomes high in summer or low in winter by a stop of an air conditioner, for example.

However, when the dead battery preventing device according to the fourth aspect of the present invention is used, the restricting condition includes that the operation for restricting the power supply to the electrical components by the user (e.g. an operation for switching the power to an OFF state or an ACC state) has not been conducted. In other words, even if the vehicle shifted from the economy running state to the engine stall state, the power supply to the electrical components is not automatically restricted when the operation for restricting the power supply to the electrical components was conducted by the user.

When the operation was conducted, the progress speed of battery discharge becomes lower. Therefore, even if the engine stall state is continued for a little long time, there is a low risk that the battery may go dead. In addition, that the operation was conducted means a high possibility that the user knows a shift to the engine stall state. As a result, when the operation was conducted, it can be said that there is no particular problem even if the power supply to the electrical components is not automatically restricted. Thus, it is possible to prevent the restriction from being conducted more than necessary, so as not to cause user discomfort.

Furthermore, when the dead battery preventing device according to the fourth aspect of the present invention is used, the restricting condition includes any one of that the predetermined time elapsed from the point in time (e.g. a starting point of information that the vehicle is in the engine stall state) after the shift to the engine stall state, that the battery charging rate reached the prescribed value or less, and that the user is leaving or left the vehicle.

Cases where the predetermined time elapsed from a point in time after the shift to the engine stall state, resulting in a satisfaction of the restricting condition are those where the below-described four requirements are met, wherein the engine has not been restarted though a long time has elapsed since the vehicle became in the engine stall state.

1. The vehicle is in the engine stall state.

2. The vehicle shifted from the economy running state to the engine stall state.

3. The operation for restricting a power supply to the electrical components by the user has not been conducted.

4. Some time has elapsed since the vehicle shifted to the engine stall state.

In this case, there is a high possibility that the user may not notice that the vehicle is in the engine stall state, and there is also a high possibility that the user may be away from the vehicle with the vehicle left in the engine stall state. Therefore, when there is a high possibility that the user may not notice that the vehicle is in the engine stall state, or when there is a high possibility that the user may be away from the vehicle with the vehicle left in the engine stall state, the power supply to the electrical components is restricted.

Cases where the battery charging rate reached the prescribed value or less, resulting in a satisfaction of the restricting condition are those where the below-described four requirements are met, wherein the engine has not been restarted though the battery charging rate has largely decreased.

1. The vehicle is in the engine stall state.

2. The vehicle shifted from the economy running state to the engine stall state.

3. The operation for restricting a power supply to the electrical components by the user has not been conducted.

4. The battery charging rate has largely decreased.

That the battery charging rate has largely decreased means a high possibility that a long time has elapsed since the vehicle became in the engine stall state.

In this case, there is a high possibility that the user may not notice that the vehicle is in the engine stall state, and there is also a high possibility that the user may be away from the vehicle with the vehicle left and in the engine stall state. Moreover, there is a high possibility that it may be short before the battery goes dead. Therefore, when there is a high possibility that the user may not notice that the vehicle is in the engine stall state, or when there is a high possibility that the user may be away from the vehicle with the vehicle left in the engine stall state, or when there is a high possibility that it may be short before the battery goes dead, the power supply to the electrical components is restricted.

Cases where the user is leaving or left the vehicle, resulting in a satisfaction of the restricting condition are those where the below-described four requirements are met.

1. The vehicle is in the engine stall state.

2. The vehicle shifted from the economy running state to the engine stall state.

3. The operation for restricting a power supply to the electrical components by the user has not been conducted.

4. The user left the vehicle.

In this case, there is a high possibility that the user may not notice that the vehicle is in the engine stall state, and the user is away from the vehicle with the vehicle left in the engine stall state. Therefore, when there is a high possibility that the user may not notice that the vehicle is in the engine stall state, or when the user is away from the vehicle with the vehicle left in the engine stall state, the power supply to the electrical components is restricted.

Thus, when the dead battery preventing device according to the fourth aspect of the present invention is used, the restriction on the power supply to the electrical components can be reduced to the minimum necessary. Therefore, there is no doubt that a dead battery can be prevented, and extremely excellent comfort can be realized.

A dead battery preventing device according to a fifth aspect of the present invention is characterized by comprising an informing condition satisfaction judging unit for judging whether an informing condition for informing the user that the vehicle is in the engine stall state has been satisfied or not, and an information unit for informing the user that the vehicle is in the engine stall state when it is judged that the informing condition has been satisfied by the informing condition satisfaction judging unit, wherein the informing condition includes that the vehicle is in the engine stall state, and that the vehicle shifted from the economy running state to the engine stall state, and the point in time is a starting point of information by the information unit in the dead battery preventing device according to the fourth aspect of the present invention.

When the dead battery preventing device according to the fifth aspect of the present invention is used, the user is informed that the vehicle is in the engine stall state when it is judged that the informing condition for informing the user that the vehicle is in the engine stall state has been satisfied. In addition, the informing condition includes that the vehicle is in the engine stall state and that the vehicle shifted from the economy running state to the engine stall state.

Therefore, for example, as soon as the vehicle shifted from the economy running state to the engine stall state, a beeping sound is produced, and it is possible to allow the user to easily notice that the vehicle shifted from the economy running state to the engine stall state and is in the engine stall state.

The point in time in ‘a predetermined time elapsed from a point in time after the shift to the engine stall state’ which is one of the requirements for judging whether the restricting condition has been satisfied or not, is the starting point of the information. Therefore, when a power supply to the electrical components is restricted with a trigger of an elapse of a long time after the shift to the engine stall state, the information is provided before the restriction.

As a result, since there is an opportunity to allow the user to notice that the vehicle is in the engine stall state before restricting the power supply to the electrical components, it is possible to reduce the frequency of restrictions on power supply to the electrical components with a trigger of an elapse of a long time after the shift to the engine stall state.

Here, as the information method, a method for appealing to the auditory sense wherein a beeping sound or the like is produced, a method for appealing to vision wherein a display of a navigation system or the like, or meters installed on an instrument panel are used, and a method wherein a notice is provided to a portable device the user carries are exemplified.

Here, as the portable device, a key to be used in a keyless entry system for remotely controlling the opening/closing of doors, a smart key (a key the user carries in a pocket or else) to be used in a smart entry & start system wherein no key operation is required in opening/closing doors or starting an engine, and a cellular phone are exemplified.

A dead battery preventing device according to a sixth aspect of the present invention is characterized by comprising a setting unit for setting the predetermined time based on a battery condition and/or a working condition of the electrical components, wherein the predetermined time set by the setting unit is used for judging whether the restricting condition has been satisfied or not in the dead battery preventing device according to the fourth or fifth aspect of the present invention.

By the way, an amount of dischargeable electricity (i.e. an amount of electricity which can be discharged without leading to a dead battery) in the case of higher battery charging rates is larger than in the case of lower battery charging rates. Under the same conditions of amount of electricity consumed by the electrical components, the time required for battery exhaustion is longer in the case of higher battery charging rates than in the case of lower battery charging rates. That is, the time required for battery exhaustion varies depending on the battery condition.

Furthermore, the time required for battery exhaustion is shorter in the case of larger amounts of electricity consumed by the electrical components than in the case of smaller amounts of electricity consumed thereby. That is, the time required for battery exhaustion varies depending on the working condition of the electrical components.

Then, the dead battery preventing device according to the fourth or fifth aspect of the present invention comprises the setting unit for setting the predetermined time based on the battery condition and/or the working condition of the electrical components, and the predetermined time set by the setting unit is used for judging whether the restricting condition has been satisfied or not. As a result, the predetermined time in ‘a predetermined time elapsed from a point in time after the shift to the engine stall state’ which is one of the requirements for judging whether the restricting condition has been satisfied or not, is set based on the battery condition (e.g. battery charging rate) and/or the working condition (e.g. amount of electricity consumed) of the electrical components, and therefore, it is possible to more properly judge whether the restricting condition has been satisfied or not.

A dead battery preventing device according to a seventh aspect of the present invention is characterized by the electrical components, including IG units to which electric power is supplied from a battery when the power is in an IG state, and ACC units to which electric power is supplied from the battery when the power is in the IG state or an ACC state, wherein the restriction unit restricts a power supply to the IG units or the ACC units in the dead battery preventing device according to the fourth or fifth aspect of the present invention.

When the dead battery preventing device according to the seventh aspect of the present invention is used, a power supply to the IG units or the ACC units is restricted and therefore, it is possible to reliably reduce an amount of electricity consumed by the electrical components.

A dead battery prevention method according to a first aspect of the present invention is characterized by being a dead battery prevention method to be adopted in a vehicle having an economy running function, comprising a step of judging whether a restricting condition for restricting a power supply to electrical components mounted on the vehicle has been satisfied or not, and a step of restricting the power supply to the electrical components when it is judged that the restricting condition has been satisfied, wherein the restricting condition includes that the vehicle is in an engine stall state, that the vehicle shifted from an economy running state to the engine stall state, and that an operation for restricting the power supply to the electrical components by a user has not been conducted, and further includes any one of that a predetermined time elapsed from a point in time after the vehicle shifted to the engine stall state, that a battery charging rate reached a prescribed value or less, and that the user left the vehicle.

When the dead battery prevention method according to the first aspect of the present invention is used, the power supply to the electrical components mounted on the vehicle is restricted when it is judged that the restricting condition for restricting the power supply to the electrical components has been satisfied. In addition, the restricting condition includes that the vehicle is in the engine stall state, and that the vehicle shifted from the economy running state to the engine stall state. Therefore, when the vehicle shifted from the economy running state to the engine stall state, for example, a power supply line to the electrical components is shut off, a power supply to the electrical components is stopped, and the progress speed of battery discharge becomes lower. As a result, even if the engine stall state is continued a little longer, it is possible to prevent a dead battery.

By the way, from a viewpoint of prevention of a dead battery, it is very important to restrict the power supply to the electrical components so as to lower the progress speed of battery discharge in the engine stall state. However, restrictions more than necessary might actually have the opposite effect of leading to user discomfort. That is because it is considered that a room temperature becomes high in summer or low in winter by a stop of an air conditioner, for example.

However, when the dead battery prevention method according to the first aspect of the present invention is used, the restricting condition includes that the operation for restricting a power supply to the electrical components by the user (e.g. an operation for switching the power to an OFF state or an ACC state) has not been conducted. In other words, even if the vehicle shifted from the economy running state to the engine stall state, the power supply to the electrical components is not automatically restricted when the operation for restricting the power supply to the electrical components was conducted by the user.

When the operation was conducted, the progress speed of battery discharge becomes lower. Therefore, even if the engine stall state is continued for a little long time, there is a low risk that the battery may go dead. In addition, that the operation was conducted means a high possibility that the user knows a shift to the engine stall state. As a result, when the operation was conducted, it can be said that there is no particular problem even if the power supply to the electrical components is not automatically restricted. Thus, it is possible to prevent the restriction from being conducted more than necessary, so as not to cause user discomfort.

Furthermore, when the dead battery prevention method according to the first aspect of the present invention is used, the restricting condition includes any one of that the predetermined time elapsed from the point in time (e.g. a starting point of information that the vehicle is in the engine stall state) after the shift to the engine stall state, that the battery charging rate reached the prescribed value or less, and that the user is leaving or left the vehicle. As a result, the restriction on the power supply to the electrical components can be reduced to the minimum necessary. Therefore, there is no doubt that a dead battery can be prevented, and extremely excellent comfort can be realized.

DESCRIPTION OF THE PREFERRED EMBODIMENTS

Figure 1:
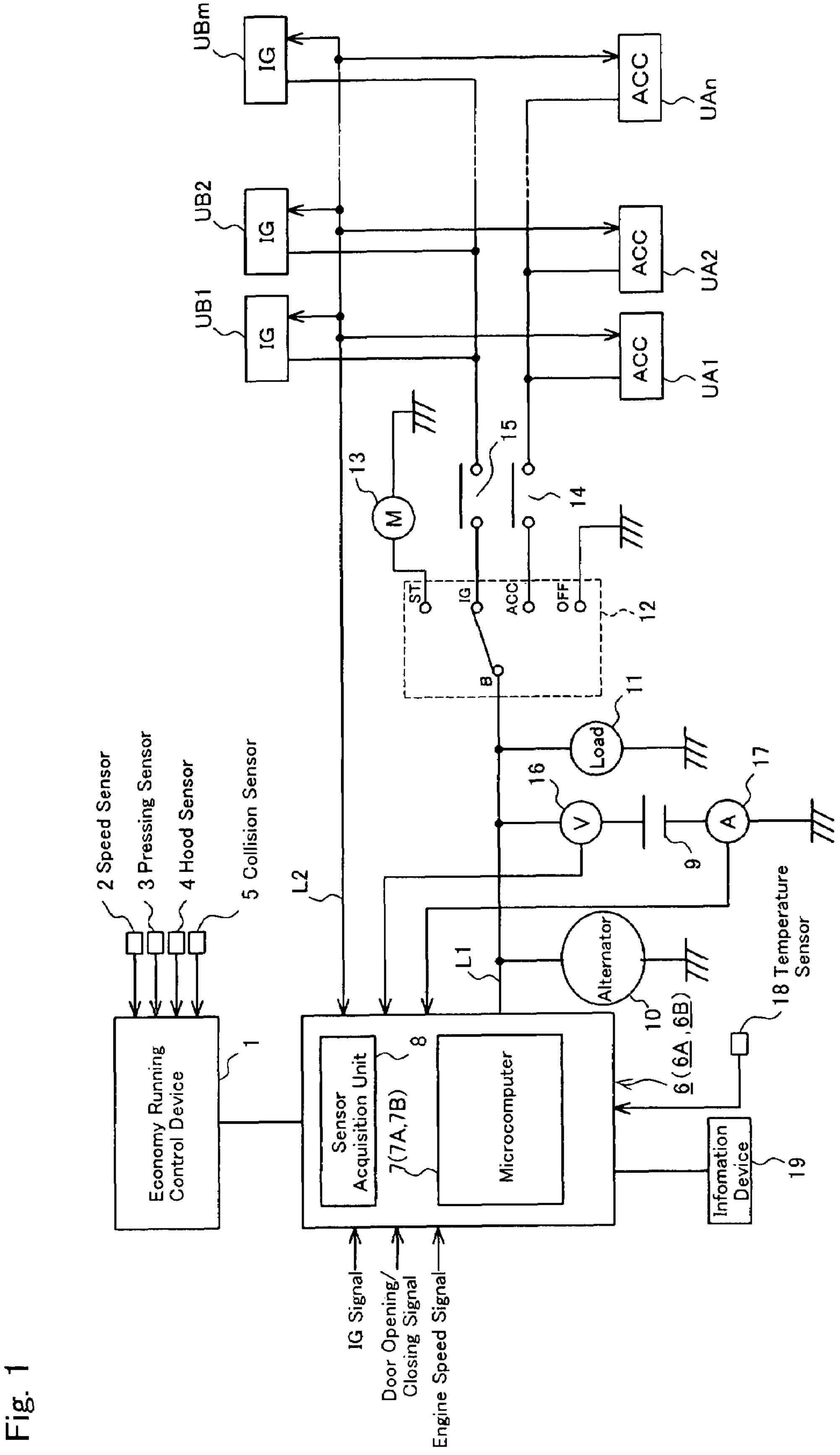
FIG. 1 is a block diagram schematically showing the principal part of a dead battery preventing system comprising a dead battery preventing device according to a first embodiment of the present invention.

The preferred embodiments of the dead battery preventing device and the dead battery prevention method according to the present invention are described below by reference to the Figures noted above. FIG. 1 is a block diagram schematically showing the principal part of a dead battery preventing system comprising a dead battery preventing device according to a first embodiment. Reference numeral 1 in FIG. 1 represents an economy running control device, to which a speed sensor 2 for detecting a speed of a vehicle, a pressing sensor 3 for detecting whether a brake pedal is held down or not, a hood sensor 4 for detecting the opening of an engine hood, and a collision sensor 5 for detecting a collision with the vehicle are connected.

The economy running control device 1 outputs an engine stop signal to an engine control device (not shown) so as to cause an engine to automatically stop, resulting in an economy running state when judging that an engine automatic stop condition has been satisfied, and starts the engine by activating a starter motor (not shown) when judging that an engine automatic start condition has been satisfied in the economy running state. As the engine automatic stop condition, a condition that a vehicle is at a stop (the speed is 0 km/h) and a condition that the brake pedal is held down are exemplified. As the engine automatic start condition, a condition that the brake pedal is not held down is exemplified.

The economy running control device 1 causes the vehicle to shift from the economy running state to an engine stall state when detecting the opening of the engine hood or detecting a collision in the economy running state. When the vehicle becomes in the engine stall state, even if the brake is released and the engine automatic start condition is satisfied, the engine does not start. That is, by shifting to the engine stall state, the engine is prohibited from automatically starting. In order to restart the engine, a user's operation is required. For example, it is necessary to turn an ignition key to a START position (ST) to activate a starter motor 13.

In addition, when the engine was automatically stopped and the vehicle became in the economy running state, the economy running control device 1 notifies a dead battery preventing device 6 that the vehicle became in the economy running state. When the vehicle returned from the economy running state, the economy running control device 1 notifies the dead battery preventing device 6 that the vehicle returned from the economy running state. And when the vehicle became in the engine stall state, the economy running control device 1 notifies the dead battery preventing device 6 that the vehicle became in the engine stall state.

The dead battery preventing device 6 comprises a microcomputer 7 and a sensor acquisition unit 8 for acquiring information from each kind of sensors. To the dead battery preventing device 6, a power line L1 for supplying electric power sent from a battery 9 is connected.

To the power line L1, not only the dead battery preventing device 6 but also an alternator 10 and a load 11 are connected, and furthermore, a B terminal of an ignition switch 12 is connected. When a START terminal (ST) is connected to the B terminal (i.e. when the ignition key is turned to the START position), electric power is supplied to the starter motor 13, the starter motor 13 is activated, and the engine is started.

When the ignition key is turned to an ACC position and an ACC terminal is connected to the B terminal of the ignition switch 12 (this situation is referred to as that the power is in an ACC state), electric power is supplied to ACC units UA1-UAn through a switch 14. When the ignition key is turned to an IG position and an IG terminal is connected to the B terminal of the ignition switch 12 (this situation is referred to as that the power is in an IG state), electric power is supplied to IG units UB1-UBm through a switch 15. After the ignition key is turned to the START position, the ignition key returns to the IG position and the IG terminal is connected to the B terminal.

Here, when the IG terminal is connected to the B terminal, the B terminal is connected to the ACC terminal, too. Each of the ACC units UA1-UAn and the IG units UB1-UBm comprises a microcomputer (not shown). And the on-off control of the switches 14 and 15 is conducted by the dead battery preventing device 6 (the microcomputer 7 thereof).

To the dead battery preventing device 6, the ACC units UA1-UAn and the IG units UB1-UBm are connected through a communication line L2, and therefore, the dead battery preventing device 6 can send/receive data to/from the ACC units UA1-UAn and the IG units UB1-UBm. For example, an instruction signal can be sent to the ACC units UA1-UAn and the IG units UB1-UBm. When the ACC units UA1-UAn and the IG units UB1-UBm receive the instruction signal, processing according to the instruction is conducted therein.

In addition, to the dead battery preventing device 6, a voltage sensor 16 for detecting a battery voltage, a current sensor 17 for detecting a battery current, a temperature sensor 18 for detecting a battery liquid temperature, and an information device 19 (e.g. an information beeper) are connected. Therefore, the dead battery preventing device 6 can grasp the battery voltage, the battery current and the battery liquid temperature, and moreover, can provide information by using the information device 19.

Furthermore, to the dead battery preventing device 6, an IG signal showing that the power is in the IG state, a door opening/closing signal showing the opening/closing of a door, and a signal showing an engine speed are sent.

Figure 2:
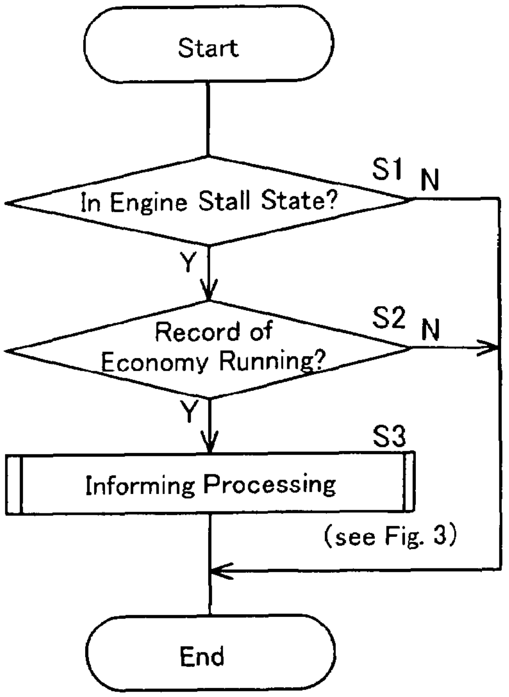
FIG. 2 is a flowchart showing a processing operation performed by a microcomputer in the dead battery preventing device according to the first embodiment.

A processing operation [1-1] performed by the microcomputer 7 in the dead battery preventing device 6 of the dead battery preventing system comprising the dead battery preventing device according to the first embodiment is described below with a flowchart shown in FIG. 2. Here, this processing operation [1-1] is conducted at every prescribed interval.

Whether the vehicle is in an engine stall state or not is judged (Step S1). When it is judged that the vehicle is in the engine stall state, whether the vehicle before a shift to the engine stall state was in an economy running state or not is judged (Step S2). Whether the vehicle is in an engine stall state or not, and whether the vehicle before a shift to the engine stall state was in an economy running state or not can be judged based on data sent from the economy running control device 1.

When it is judged that the vehicle before the shift to the engine stall state was in the economy running state, it is judged that a part of an informing condition for informing a user that the vehicle is in the engine stall state has been satisfied, and the operation goes to Step S3, wherein "informing processing" (see FIG. 3) is conducted.

On the other hand, when it is judged that the vehicle is not in the engine stall state in Step S1, or when it is judged that the vehicle before the shift to the engine stall state was not in the economy running state in Step S2, the processing operation [1-1] is concluded at once.

Figure 3:
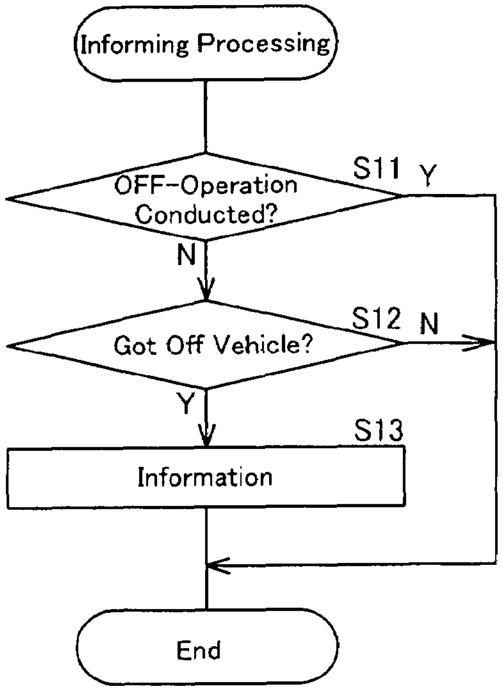
FIG. 3 is a flowchart showing a processing operation performed by the microcomputer in the dead battery preventing device according to the first embodiment.

The processing operation "informing processing" (Step S3 of FIG. 2) performed by the microcomputer 7 in the dead battery preventing device 6 of the dead battery preventing system comprising the dead battery preventing device according to the first embodiment is described below with a flowchart shown in FIG. 3. Whether an operation for restricting a power supply to electrical components UT (the ACC units UA1-UAn and the IG units UB1-UBm) mounted on the vehicle was conducted by the user or not is judged (Step S11).

As the operation for restricting a power supply to the electrical components, an operation of the ignition key for making the power in an OFF state or in an ACC state is exemplified. When a smart entry & start system is adopted, an operation for switching the power state (from OFF state to ACC state, to IG state, to OFF state, to ACC state . . . ) by pushing an engine switch without pressing the brake pedal, is exemplified.

When the vehicle is in the engine stall state, the power becomes in the IG state and an IG signal is sent to the dead battery preventing device 6. As a result, the dead battery preventing device 6 can recognize that the power was changed from the IG state to the OFF state or the ACC state depending on whether the IG signal was received or not.

When it is judged that no operation for restricting the power supply to the electrical components has been conducted, whether the user is leaving (or left) the vehicle or not is judged (Step S12). When it is judged that the user is leaving (or left) the vehicle, it is judged that an informing condition has been satisfied, and by controlling the information device 19, the user is informed that the vehicle is in the engine stall state (Step S13).

Whether the user is leaving (or left) the vehicle or not can be judged based on an opening/closing state of the door, a use state of a seat belt, a load state of a seat, a detection state of a smart key the user carries, and the like. For example, when the door is opened or the seat belt is unlatched, it can be judged that the user has an intention of getting off the vehicle (the user is leaving the vehicle). When the load on the seat became light, it can be judged that the user got off the vehicle (the user left the vehicle). And since the detection range of the smart key is about 3 m at the maximum, it can be judged that the user left the vehicle when the smart key became unable to be detected.

On the other hand, when it is judged that the operation for restricting the power supply to the electrical components was conducted in Step S11, or when it is judged that the user is not leaving (or is not away from) the vehicle in Step S12, the "informing processing" is concluded at once since there is no need to inform that the vehicle is in the engine stall state.

Here, when it is judged that the vehicle is in the engine stall state, it is judged that the vehicle shifted from the economy running state to the engine stall state, it is judged that no operation for restricting the power supply to the electrical components has been conducted, and then, it is judged that the user is leaving (or left) the vehicle, the informing condition is judged as having been satisfied, and the user is informed that the vehicle is in the engine stall state. However, in another embodiment, judging that the operation has not been conducted, or judging that the user is leaving (or left) the vehicle may be excluded from the informing condition.

For example, just after a shift from the economy running state to the engine stall state, the user may be informed that the vehicle is in the engine stall state. Or when the engine stall state has continued for a predetermined time since the vehicle shifted from the economy running state to the engine stall state, the user may be informed that the vehicle is in the engine stall state.

Figure 4:
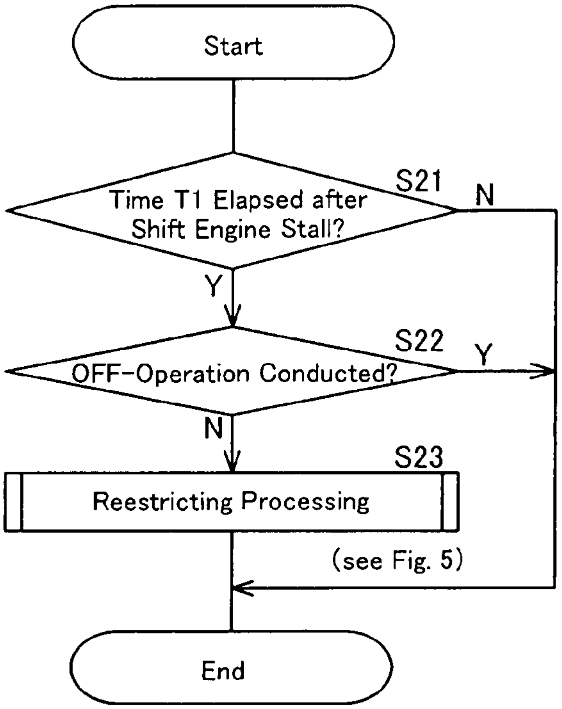
FIG. 4 is a flowchart showing a processing operation performed by the microcomputer in the dead battery preventing device according to the first embodiment.

A processing operation [1-2] performed by the microcomputer 7 in the dead battery preventing device 6 of the dead battery preventing system comprising the dead battery preventing device according to the first embodiment is described below with a flowchart shown in FIG. 4. Here, this processing operation [1-2] is conducted at every prescribed interval.

Whether the engine stall state has continued for a predetermined time T1 or more since the vehicle shifted from the economy running state to the engine stall state is judged (Step S21). When it is judged that the engine stall state has continued for the predetermined time T1 or more, whether an operation for restricting a power supply to the electrical components mounted on the vehicle (e.g. an operation of the ignition key for changing the power to the OFF state or the ACC state) was conducted by the user or not is judged (Step S22).

When it is judged that no operation for restricting the power supply to the electrical components has been conducted by the user, it is judged that a restricting condition for restricting the power supply to the electrical components has been satisfied, and the operation goes to Step S23, wherein "restricting processing" (see FIG. 5) is conducted.

On the other hand, when it is judged that the engine stall state has not continued for the predetermined time T1 or more in Step S21, or when it is judged that the operation for restricting the power supply to the electrical components was conducted by the user in Step S22, the processing operation [1-2] is concluded at once.

Figure 5:
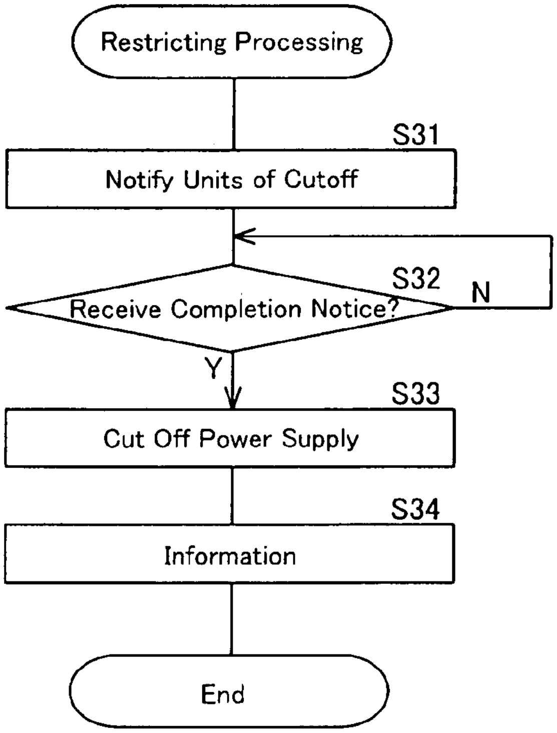
FIG. 5 is a flowchart showing a processing operation performed by the microcomputer in the dead battery preventing device according to the first embodiment.

The processing operation "restricting processing" (Step S23 of FIG. 4) performed by the microcomputer 7 in the dead battery preventing device 6 of the dead battery preventing system comprising the dead battery preventing device according to the first embodiment is described below with a flowchart shown in FIG. 5. A notice that a power supply is cut off is sent to the ACC units UA1-UAn and the IG units UB1-UBm (Step S31).

When receiving the notice that the power supply is cut off from the dead battery preventing device 6, the ACC units UA1-UAn and the IG units UB1-UBm make preparations to the cutoff such as storing the status before the power supply is cut off, and notifies the dead battery preventing device 6 of the end of the preparations when the preparations were finished.

When receiving the notice of the completion of the preparations from the ACC units UA1-UAn and the IG units UB1-UBm (Step S32), the microcomputer 7 in the dead battery preventing device 6 cuts off the power supply to the ACC units UA1-UAn and the IG units UB1-UBm by opening the switches 14 and 15 (Step S33), and then, informs the user of the cutoff by controlling the information device 19 (Step S34).

Here, the power supply to all of the ACC units UA1-UAn and the IG units UB1-UBm is restricted. However, in another embodiment, a power supply to either of the ACC units UA1-UAn and the IG units UB1-UBm may be restricted.

Moreover, the power supply to the ACC units UA1-UAn and the IG units UB1-UBm is directly cut off by controlling the switches 14 and 15 here. However, in another embodiment, an instruction to go into a sleep mode may be sent to the ACC units UA1-UAn and the IG units UB1-UBm so as to cause each of the ACC units UA1-UAn and the IG units UB1-UBm to stop starting.

Figure 6:
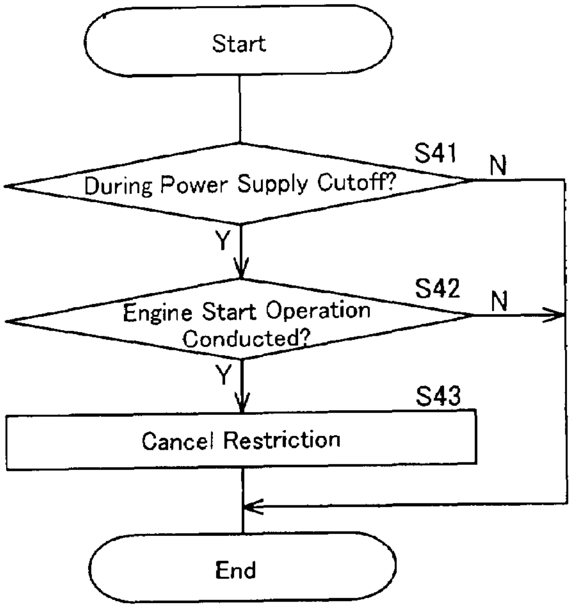
FIG. 6 is a flowchart showing a processing operation performed by the microcomputer in the dead battery preventing device according to the first embodiment.

A processing operation [1-3] performed by the microcomputer 7 in the dead battery preventing device 6 of the dead battery preventing system comprising the dead battery preventing device according to the first embodiment is described below with a flowchart shown in FIG. 6. Here, this processing operation [1-3] is conducted at every prescribed interval.

Whether the power supply to the ACC units UA1-UAn and the IG units UB1-UBm has been restricted or not (i.e. whether the switches 14 and 15 have been opened or not) is judged (Step S41). When it is judged that the switches 14 and 15 have been opened, whether an operation for engine start was conducted by the user or not is judged (Step S42).

As the operation for engine start, turning the ignition key to the START position is exemplified. When the smart entry & start system is adopted, pushing the engine switch with pressing the brake pedal is exemplified. Here, whether an operation for engine start was conducted or not is judged from an engine speed, for example.

When it is judged that the operation for engine start (e.g. turning the ignition key to the START position) was conducted by the user, the switches 14 and 15 are closed and a start permit signal is sent to the ACC units UA1-UAn and the IG units UB1-UBm so as to cancel the restriction on the power supply to the ACC units UA1-UAn and the IG units UB1-UBm (Step S43).

On the other hand, when it is judged that the switches 14 and 15 have not been opened and that the power supply to the ACC units UA1-UAn and the IG units UB1-UBm has not been restricted in Step S41, or when it is judged that no operation for engine start has been conducted in Step S42, the processing operation [1-3] is concluded at once.

By using the dead battery preventing system comprising the dead battery preventing device according to the first embodiment, when it is judged that the vehicle is in the engine stall state, it is judged that the vehicle shifted from the economy running state to the engine stall state, it is judged that no operation for restricting the power supply to the electrical components has been conducted, and then, it is judged that the user is leaving (or left) the vehicle, the informing condition is judged as having been satisfied, and the user is informed that the vehicle is in the engine stall state.

Thus, it is possible to allow the user to easily know that the vehicle is in the engine stall state, and therefore, it is possible to prevent the vehicle from being left in the engine stall state. As a result, an event where battery discharge excessively progresses owing to the vehicle's being long left in the engine stall state, resulting in a dead battery, can be avoided.

Moreover, since the informing condition includes that the operation for restricting a power supply to the electrical components (e.g. an operation for changing the power from the OFF state or the ACC state) by the user has not been conducted and that the user is leaving (or left) the vehicle, it is possible to prevent the information from being provided more than necessary, so as not to cause user discomfort.

Furthermore, by using the dead battery preventing system comprising the dead battery preventing device according to the first embodiment, when it is judged that the vehicle shifted from the economy running state to the engine stall state, it is judged that the engine stall state has continued for the predetermined time T1 or more, and it is judged that no operation for restricting the power supply to the electrical components has been conducted, the restricting condition is judged as having been satisfied and the power supply to the electrical components is restricted.

Thus, it is possible to more reliably prevent a dead battery. And the restriction on the power supply to the electrical components can be reduced to the minimum necessary, and extremely excellent comfort can be realized.

Figure 7:
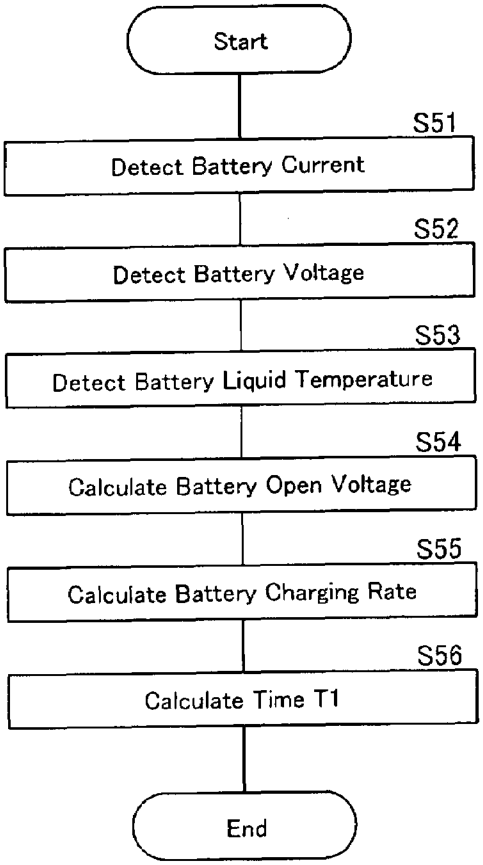
FIG. 7 is a flowchart showing a processing operation performed by the microcomputer in the dead battery preventing device according to the first embodiment.

The predetermined time T1 may be a fixed value, but the predetermined time T1 may be set based on a battery condition and a working condition of the electrical components. A processing operation [1-4] performed by the microcomputer 7 when the predetermined time T1 is set based on a battery condition and a working condition of the electrical components is described below with a flowchart shown in FIG. 7. Here, this processing operation [1-4] is conducted at every prescribed interval.

A battery current I and a battery voltage V are detected (Steps S51 and S52), and a battery liquid temperature TH is detected (Step S53). Then, based on the detected battery current I and battery voltage V, and a previously obtained battery internal resistance R, a battery open voltage $V_{OPN}$ is obtained (Step S54).

The battery open voltage $V_{OPN}$ can be obtained from a pair of battery voltage V with battery current I (plus in charging and minus in discharging), and a battery internal resistance R as shown below.

$$V_{OPN}=V-I\cdot R$$

The battery internal resistance R can be obtained from two pairs of battery voltages Va and Vb with battery currents Ia and Ib or more as shown below.

$$R=(Vb-Va)/(Ib-Ia)$$

Figure 8:
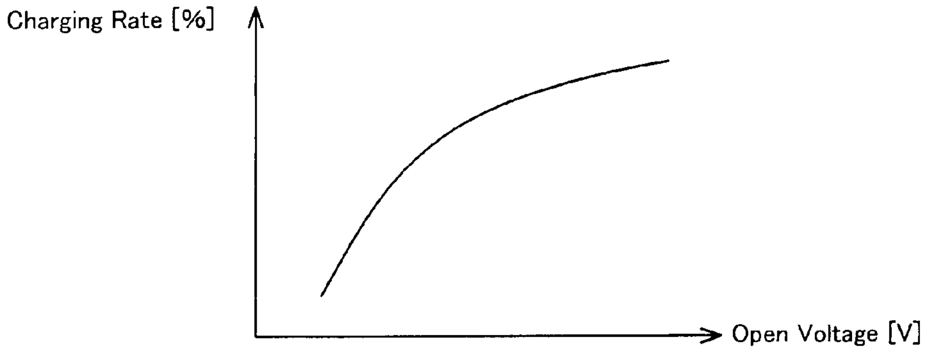
FIG. 8 is a graph showing a relation between a battery open voltage and a battery charging rate.

Based on a map showing a correlation between a battery open voltage $V_{OPN}$ and a battery charging rate SOC as shown in FIG. 8, the battery open voltage $V_{OPN}$ is converted into the battery charging rate SOC, and then, based on the battery internal resistance R and the battery liquid temperature TH, the battery charging rate SOC is corrected (Step S55).

Figure 9:
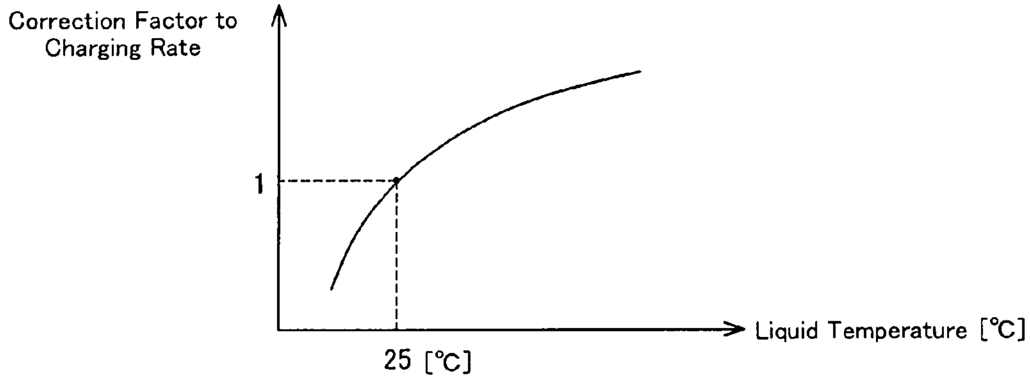
FIG. 9 is a graph showing a relation between a battery liquid temperature and a correction factor to the battery charging rate.

The battery charging rate SOC has temperature characteristics depending on the battery liquid temperature TH as shown in FIG. 9. For example, by multiplying the battery charging rate SOC obtained by converting the battery open voltage $V_{OPN}$ by a correction factor k1 based on the battery liquid temperature TH, the battery charging rate SOC can be corrected.

A reference value of the battery liquid temperature TH is 25[° C.]. When the battery liquid temperature TH is 25[° C.], the correction factor k1 is 1. When the battery liquid temperature TH becomes higher than 25[° C.], the correction factor k1 becomes larger than 1. Conversely, when the battery liquid temperature TH becomes lower than 25[° C.], the correction factor k1 becomes smaller than 1.

Figure 10:
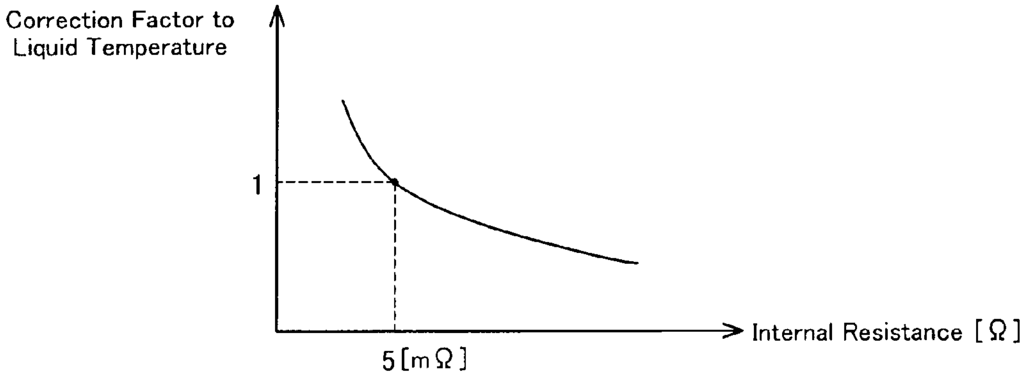
FIG. 10 is a graph showing a relation between a battery internal resistance and a correction factor to the battery liquid temperature.

When the battery internal resistance R is taken into account, based on a relation between the battery internal resistance R and the battery liquid temperature TH as shown in FIG. 10, the battery liquid temperature TH may be corrected, and by using the corrected battery liquid temperature TH, the correction factor k1 may be determined. For example, the battery liquid temperature TH is multiplied by a correction factor k2.

A reference value of the battery internal resistance R is 5 [mΩ]. When the battery internal resistance R is 5 [mΩ], the correction factor k2 is 1. When the battery internal resistance R becomes larger than 5 [mΩ], the correction factor k2 becomes smaller than 1. Conversely, when the battery internal resistance R becomes smaller than 5 [mΩ], the correction factor k2 becomes larger than 1.

After calculating the battery charging rate SOC in Step S55, based on the battery charging rate SOC, a battery capacity, and a working condition (consumption rate of electricity) of the electrical components, a predetermined time T1 is calculated as shown below (Step S56).

Amount of Dischargeable Electricity=Battery Capacity×(Battery Charging Rate *SOC*−Prescribed Value)

This prescribed value indicates a battery charging rate which should be secured for battery start (e.g. 30[%]). For example, in a case where the battery capacity is 55 [Ah] and the battery charging rate SOC is 90[%], the amount of dischargeable electricity becomes 33 [Ah] (=55×0.6).

In a case where a consumption rate of electricity of the electrical components is 5 [A], a remaining period until the battery goes dead becomes 6.6 hours (=33 [Ah]/5 [A]).

Accordingly, if the predetermined time T1 is made shorter than 6.6 hours, a restriction can be imposed on the electrical components before the battery goes dead. If the battery need be protected from degradation, the predetermined time T1 may be set to be shorter. Here, the consumption rate of electricity of the electrical components can be grasped, for example, by installing a current sensor for detecting a current consumed by the ACC units UA1-UAn and the IG units UB1-UBm and acquiring data obtained from this current sensor.

A dead battery preventing system comprising a dead battery preventing device according to a second embodiment is described below. Here, the dead battery preventing system has the same construction as that shown in FIG. 1 except the dead battery preventing device 6 and the microcomputer 7. Therefore, a dead battery preventing device and a microcomputer are differently marked and other components are not described below.

The microcomputer 7A in the dead battery preventing device 6A of the dead battery preventing system comprising the dead battery preventing device according to the second embodiment performs a processing operation [2-1] similar to the processing operation [1-1] performed by the microcomputer 7 in the dead battery preventing device 6, so as to inform a user that a vehicle is in an engine stall state.

Figure 11:
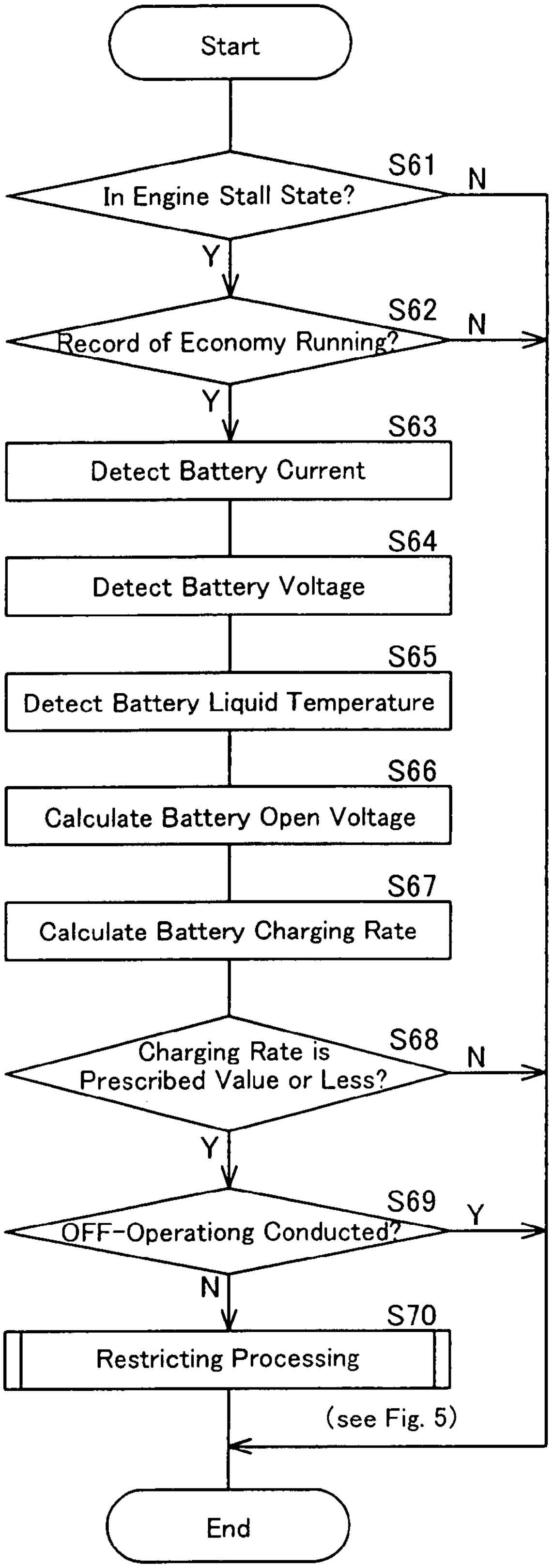
FIG. 11 is a flowchart showing a processing operation performed by a microcomputer in a dead battery preventing device according to a second embodiment.

A processing operation [2-2] performed by the microcomputer 7A in the dead battery preventing device 6A of the dead battery preventing system comprising the dead battery preventing device according to the second embodiment is described below with a flowchart shown in FIG. 11. Here, this processing operation [2-2] is conducted at every prescribed interval.

Whether the vehicle is in an engine stall state or not is judged (Step S61). When it is judged that the vehicle is in the engine stall state, whether the vehicle before a shift to the engine stall state was in an economy running state or not is judged (Step S62). Whether the vehicle is in an engine stall state or not, and whether the vehicle before a shift to the engine stall state was in an economy running state or not can be judged based on data sent from an economy running control device 1.

When it is judged that the vehicle before the shift to the engine stall state was in the economy running state, it is judged that a part of a restricting condition for restricting a power supply to electrical components (ACC units UA1-UAn and IG units UB1-UBm) mounted on the vehicle has been satisfied.

On the other hand, when it is judged that the vehicle is not in the engine stall state in Step S61, or when it is judged that the vehicle before the shift to the engine stall state was not in the economy running state in Step S62, the processing operation [2-2] is concluded at once.

When it is judged that a part of the restricting condition has been satisfied in Step S62, a battery current I and a battery voltage V are detected (Steps S63 and S64), and a battery liquid temperature TH is detected (Step S65). Then, based on the detected battery current I and battery voltage V, and a previously obtained battery internal resistance R, a battery open voltage $V_{OPN}$ is obtained (Step S66). How to obtain the battery open voltage $V_{OPN}$ is described above.

The battery open voltage $V_{OPN}$ is converted into a battery charging rate SOC, and then, based on the battery internal resistance R and the battery liquid temperature TH, the battery charging rate SOC is corrected (Step S67). And whether the battery charging rate SOC is a prescribed value (e.g. 30[%]) or less is judged (Step S68).

When it is judged that the battery charging rate SOC is the prescribed value (e.g. a limit value at which a battery will go dead if this consumption state of electricity is continued a little longer) or less, whether an operation for restricting a power supply to the electrical components mounted on the vehicle (e.g. an operation of an ignition key for changing the power to an OFF state or an ACC state) was conducted by the user or not is judged (Step S69).

When it is judged that the operation for restricting the power supply to the electrical components has not been conducted by the user, it is judged that the restricting condition for restricting the power supply to the electrical components has been satisfied, and the operation goes to Step S70, wherein "restricting processing" (see FIG. 5) is conducted.

On the other hand, when it is judged that the battery charging rate SOC is more than the prescribed value in Step S68, or when it is judged that the operation for restricting the power supply to the electrical components was conducted by the user in Step S69, the processing operation [2-2] is concluded at once.

A dead battery preventing system comprising a dead battery preventing device according to a third embodiment is described below. Here, the dead battery preventing system has the same construction as that shown in FIG. 1 except the dead battery preventing device 6 and the microcomputer 7. Therefore, a dead battery preventing device and a microcomputer are differently marked and other components are not described below.

Figure 12:
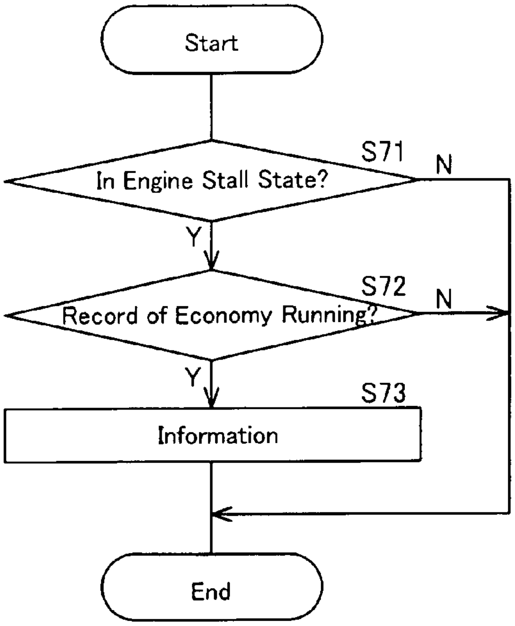
FIG. 12 is a flowchart showing a processing operation performed by a microcomputer in a dead battery preventing device according to a third embodiment.

A processing operation [3-1] performed by the microcomputer 7B in the dead battery preventing device 6B of the dead battery preventing system comprising the dead battery preventing device according to the third embodiment is described below with a flowchart shown in FIG. 12. Here, this processing operation [3-1] is conducted at every prescribed interval.

Whether a vehicle is in an engine stall state or not is judged (Step S71). When it is judged that the vehicle is in the engine stall state, whether the vehicle before a shift to the engine stall state was in an economy running state or not is judged (Step S72). Whether a vehicle is in an engine stall state or not, and whether the vehicle before a shift to the engine stall state was in an economy running state or not can be judged based on data sent from an economy running control device 1.

When it is judged that the vehicle before the shift to the engine stall state was in the economy running state, it is judged that an informing condition for informing a user that the vehicle is in the engine stall state has been satisfied, and by controlling an information device 19, the user is informed that the vehicle is in the engine stall state (Step S73).

On the other hand, when it is judged that the vehicle is not in the engine stall state in Step S71, or when it is judged that the vehicle before the shift to the engine stall state was not in the economy running state in Step S72, the processing operation [3-1] is concluded at once.

Figure 13:
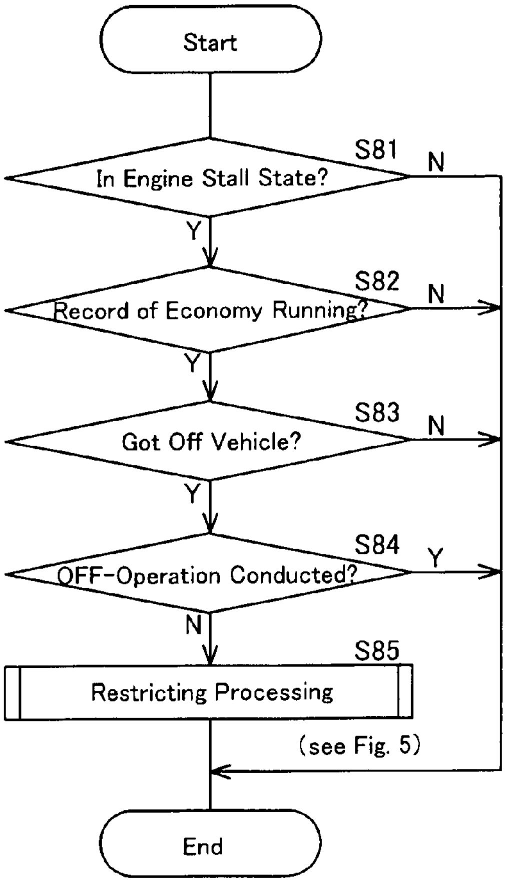
FIG. 13 is a flowchart showing a processing operation performed by the microcomputer in the dead battery preventing device according to the third embodiment.

A processing operation [3-2] performed by the microcomputer 7B in the dead battery preventing device 6B of the dead battery preventing system comprising the dead battery preventing device according to the third embodiment is described below with a flowchart shown in FIG. 13. Here, this processing operation [3-2] is conducted at every prescribed interval.

Whether the vehicle is in an engine stall state or not is judged (Step S81). When it is judged that the vehicle is in the engine stall state, whether the vehicle before a shift to the engine stall state was in an economy running state or not is judged (Step S82). Whether the vehicle is in an engine stall state or not, and whether the vehicle before a shift to the engine stall state was in an economy running state or not can be judged based on data sent from the economy running control device 1.

When it is judged that the vehicle before the shift to the engine stall state was in the economy running state, it is judged that a part of a restricting condition for restricting a power supply to electrical components (ACC units UA1-UAn and IG units UB1-UBm) mounted on the vehicle has been satisfied.

On the other hand, when it is judged that the vehicle is not in the engine stall state in Step S81, or when it is judged that the vehicle before the shift to the engine stall state was not in the economy running state in Step S82, the processing operation [3-2] is concluded at once.

When it is judged that a part of the restricting condition has been satisfied in Step S82, whether the user is leaving (or left) the vehicle or not is judged (Step S83). When it is judged that the user is leaving (or left) the vehicle, whether an operation for restricting a power supply to the electrical components mounted on the vehicle (e.g. an operation of an ignition key for changing the power to an OFF state or an ACC state) was conducted by the user or not is judged (Step S84).

When it is judged that no operation for restricting the power supply to the electrical components has been conducted by the user, it is judged that the restricting condition for restricting the power supply to the electrical components has been satisfied, and the operation goes to Step S85, wherein "restricting processing" (see FIG. 5) is conducted.

On the other hand, when it is judged that the user is not leaving (or is not away from) the vehicle in Step S83, or when it is judged that the operation for restricting the power supply to the electrical components was conducted by the user in Step S84, the processing operation [3-2] is concluded at once.

Figure 14:
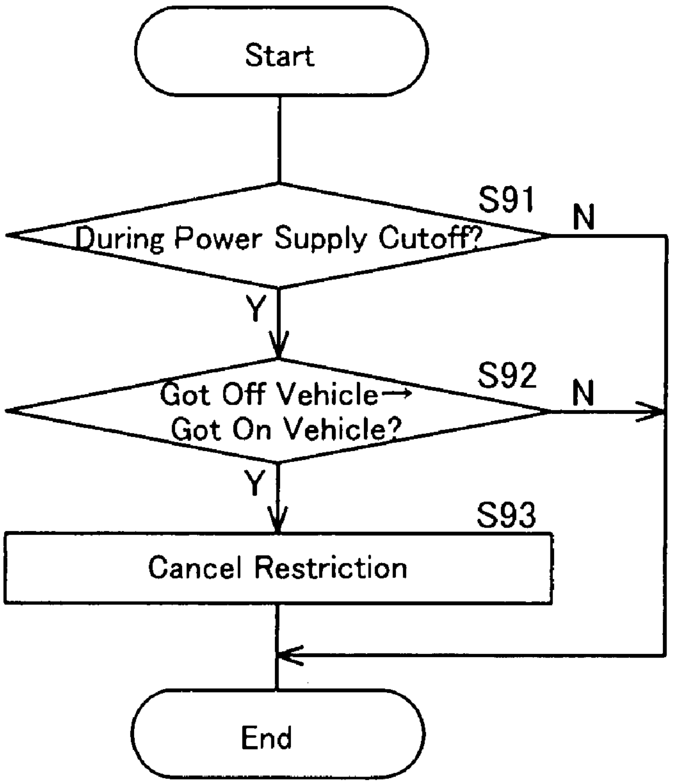
FIG. 14 is a flowchart showing a processing operation performed by the microcomputer in the dead battery preventing device according to the third embodiment.

A processing operation [3-3] performed by the microcomputer 7B in the dead battery preventing device 6B of the dead battery preventing system comprising the dead battery preventing device according to the third embodiment is described below with a flowchart shown in FIG. 14. Here, this processing operation [3-3] is conducted at every prescribed interval.

Whether the power supply to the ACC units UA1-UAn and the IG units UB1-UBm has been restricted or not (i.e. whether switches 14 and 15 have been opened or not) is judged (Step S91). When it is judged that the switches 14 and 15 have been opened, whether the user came back to the vehicle or not is judged (Step S92).

When it is judged that the user came back to the vehicle, the switches 14 and 15 are closed, and a start permit signal is sent to the ACC units UA1-UAn and the IG units UB1-UBm so as to cancel the restriction on the power supply to the ACC units UA1-UAn and the IG units UB1-UBm (Step S93).

On the other hand, when it is judged that the switches 14 and 15 have not been opened, and that the power supply to the ACC units UA1-UAn and the IG units UB1-UBm has not been restricted in Step S91, or when it is judged that the user has not come back to the vehicle in Step S92, the processing operation [3-3] is concluded at once.

Whether the user came back to the vehicle or not can be judged by using an opening/closing state of a door, a use state of a seat belt, a load state of a seat, a detection state of a smart key the user carries, and the like. For example, when the door was opened, it can be judged that the user has an intention of getting on the vehicle. When the seat belt was fastened or a load on the seat became heavier, it can be judged that the user got on the vehicle. In addition, since the detection range of the smart key is about 3 m at the maximum, it can be judged that the user approached the vehicle when the smart key became able to be detected.

Figure 15:
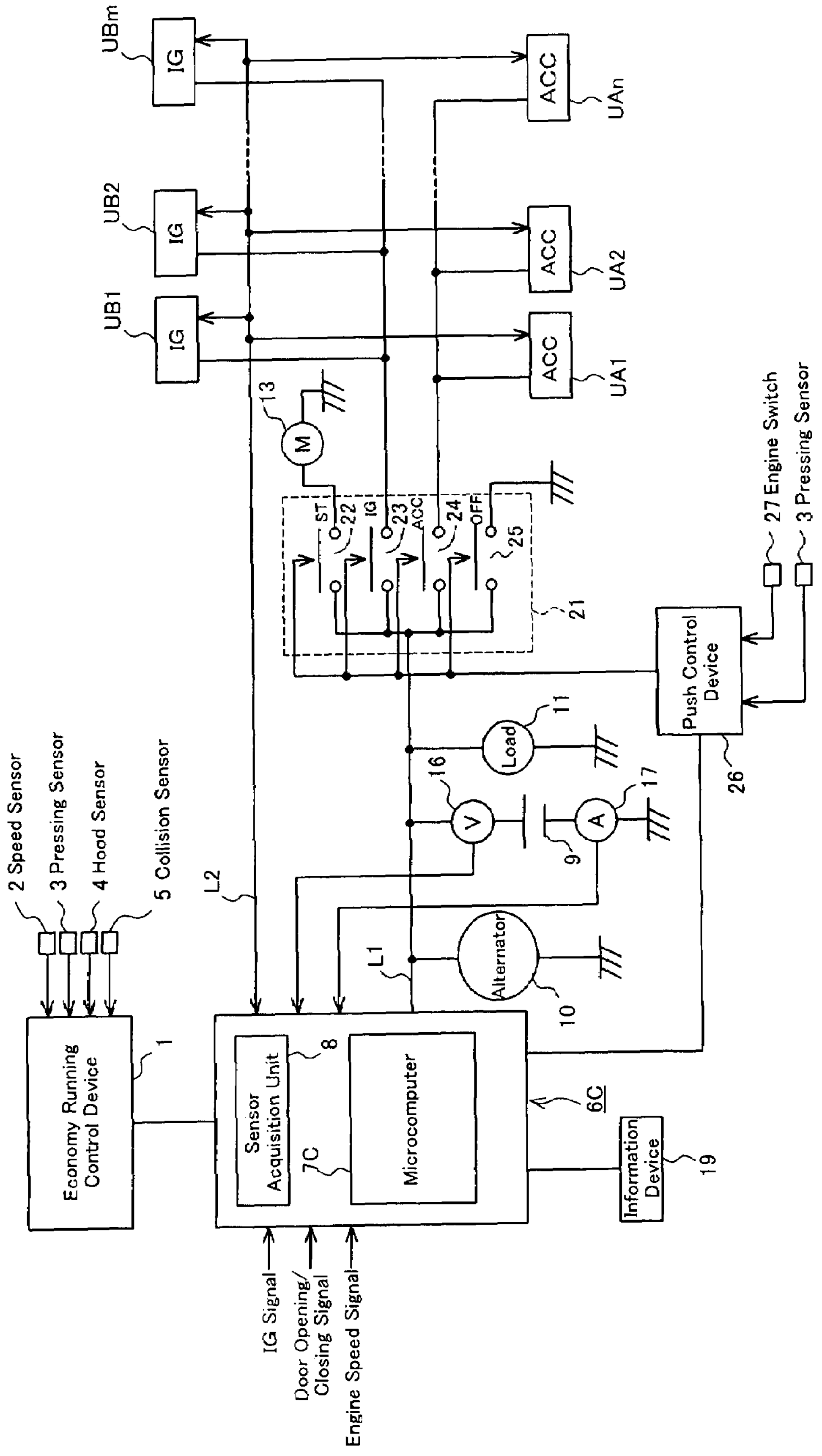
FIG. 15 is a block diagram schematically showing the principal part of a dead battery preventing system comprising a dead battery preventing device according to a fourth embodiment.

In the dead battery preventing systems comprising the dead battery preventing devices according to the first to third embodiments, cases where a vehicle in which a mechanical ignition key is adopted is used have been described. However, these systems can be used in not only a vehicle in which the mechanical ignition key is adopted but also a vehicle in which a smart entry & start system is adopted, for example. FIG. 15 is a construction diagram of a system in the case of being used in such vehicle.

Reference numeral 1 in FIG. 15 represents an economy running control device, which notifies a dead battery preventing device 6C that the vehicle became in an economy running state when an engine was automatically stopped, resulting in the economy running state, which notifies the dead battery preventing device 6C that the vehicle returned from the economy running state when the vehicle returned from the economy running state, and which notifies the dead battery preventing device 6C that the vehicle became in an engine stall state when the vehicle became in the engine stall state.

The dead battery preventing device 6C comprises a microcomputer 7C and a sensor acquisition unit 8 for acquiring information from each kind of sensors. To the dead battery preventing device 6C, a power line L1 for supplying electric power sent from a battery 9 is connected.

To the power line L1, not only the dead battery preventing device 6C but also an alternator 10 and a load 11 are connected, and furthermore, one terminal of each of switches 22-25 of an ignition switch 21 is connected. When the switch 22 is closed, electric power is supplied to a starter motor 13 so as to activate the starter motor 13, resulting in a start of the engine.

When the switch 24 is closed (this situation is referred to as that the power is in an ACC state), electric power is supplied to ACC units UA1-UAn. When the switch 23 is closed (this situation is referred to as that the power is in an IG state), electric power is supplied to IG units UB1-UBm. The opening/closing of the switches 22-25 is controlled by a push control device 26.

The push control device 26 comprises a microcomputer (not shown). To the push control device 26, an engine switch 27 to be operated by a user and a pressing sensor 3 for detecting whether a brake pedal is held down or not are connected. When judging that the engine switch 27 is being pushed with the brake pedal pressed, the push control device 26 closes the switch 22 so as to start the engine.

In addition, when judging that the engine switch 27 is being pushed without the brake pedal pressed, the push control device 26 controls the opening/closing of the switches 23-25 so as to change the power from the OFF state to the ACC state, to the IG state, and to the OFF state.

In the dead battery preventing devices according to the first to third embodiments, the microcomputer 7, 7A or 7B of the dead battery preventing device 6, 6A or 6B controls the opening/closing of the switches 14 and 15 so as to restrict a power supply to the ACC units UA1-UAn and the IG units UB1-UBm. However, in the dead battery preventing device according to the above-described fourth embodiment, the microcomputer 7C of the dead battery preventing device 6C does not directly control the switches 23-25 but controls the push control device 26 so as to control the opening/closing of the switches 23-25. As a result, the system construction can be simplified.

What is claimed is:

1. A dead battery preventing system to be mounted on a vehicle having an economy running function, comprising:

a plurality of sensors for detecting operating conditions of the vehicle;

a sensor acquisition unit that receives signals from said plurality of sensors regarding operating conditions of the vehicle; and a control unit that receives informing condition signals from said sensor acquisition unit regarding the received signals from said plurality of sensors, the control unit, based on the informing condition signals, judges whether at least one informing condition for informing a user that the vehicle is in an engine stall state has been satisfied or not, and informs the user of the vehicle that the vehicle is in the engine stall state when it is judged that the at least one informing condition has been satisfied, wherein the at least one informing condition includes that the vehicle is in the engine stall state, that the vehicle shifted from an economy running state to the engine stall state, and that an operation for restricting a power supply that supplies power to electrical components mounted on the vehicle was conducted or not, and wherein the power from the power supply that supplies power to the electrical components of the vehicle is restricted based on the at least one informing condition being satisfied.

2. A dead battery preventing system according to claim 1, wherein said control unit judges whether the operation for restricting the power supply that supplies power to the electrical components mounted on the vehicle was conducted by the user or not.

3. A dead battery preventing system according to claim 1, wherein the at least one informing condition includes whether or not the user is leaving or left the vehicle, and said control unit judges whether or not the user is leaving or left the vehicle.

4. A dead battery preventing device to be mounted on a vehicle having an economy running function, comprising:

a sensor acquisition unit that receives signals from a plurality of sensors regarding operating conditions of the vehicle; and a control unit that receives informing condition signals from said sensor acquisition unit regarding the received signals from the plurality of sensors, the control unit, based on the informing condition signals, judges whether at least one restricting condition for restricting power from a power supply that supplies power to electrical components mounted on the vehicle has been satisfied or not, and restricts the power supply that supplies power to the electrical components when it is judged that the at least one restricting condition has been satisfied, wherein the at least one restricting condition includes that the vehicle is in an engine stall state, that the vehicle shifted from an economy running state to the engine stall state, and that an operation for restricting the power supply that supplies power to the electrical components has not been conducted by a user, and wherein the at least one restricting condition also includes any one of that a predetermined time elapsed from a point in time after the vehicle shifted to the engine stall state, that a battery charging rate reached a prescribed value or less, and that the user is leaving or left the vehicle.

5. A dead battery preventing device according to claim 4, wherein the control unit judges whether at least one informing condition for informing the user that the vehicle is in the engine stall state has been satisfied or not, and informs the user that the vehicle is in the engine stall state when it is judged that the at least one informing condition has been satisfied, wherein the at least one informing condition includes that the vehicle is in the engine stall state and that the vehicle shifted from the economy running state to the engine stall state, and wherein the point in time is a starting point at which information is provided by the control unit to the user.

* * * * *